United States Patent
Pang

(10) Patent No.: US 10,452,757 B2
(45) Date of Patent: Oct. 22, 2019

(54) PERSISTENT USER PERSONALIZATION

(71) Applicant: Oracle International Corporation, Redwood Shores, CA (US)

(72) Inventor: Li Pang, Burnaby (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 508 days.

(21) Appl. No.: 14/553,928

(22) Filed: Nov. 25, 2014

(65) Prior Publication Data

US 2016/0149988 A1    May 26, 2016

(51) Int. Cl.
  *G06F 17/22* (2006.01)
  *G06F 3/0481* (2013.01)
  *H04W 4/18* (2009.01)

(52) U.S. Cl.
  CPC ........ *G06F 17/2247* (2013.01); *G06F 3/0481* (2013.01); *H04W 4/18* (2013.01)

(58) Field of Classification Search
  CPC ..... G06F 17/2247; G06F 3/0481; H04W 4/18
  See application file for complete search history.

(56) References Cited

U.S. PATENT DOCUMENTS

| 7,912,917 | B2 | 3/2011 | Chakra et al. |
| 8,316,309 | B2 | 11/2012 | Bartek et al. |
| 8,326,922 | B2 | 12/2012 | Kern et al. |
| 2002/0035699 | A1 * | 3/2002 | Crosbie ............. H04L 63/10 726/12 |
| 2004/0143796 | A1 * | 7/2004 | Lerner ............. G06F 3/04883 715/234 |
| 2005/0097190 | A1 * | 5/2005 | Abdelhak ......... G06F 17/30873 709/217 |
| 2007/0157203 | A1 * | 7/2007 | Lim ................. G06F 9/468 718/100 |
| 2010/0299406 | A1 * | 11/2010 | Murata ............. H04L 41/0253 709/219 |
| 2011/0185287 | A1 * | 7/2011 | Dharmarajan .... G06F 17/30902 715/752 |

(Continued)

FOREIGN PATENT DOCUMENTS

CN          103647971 A  *  3/2014

*Primary Examiner* — Justin S Lee
*Assistant Examiner* — Benjamin J Norris
(74) *Attorney, Agent, or Firm* — Tarolli, Sundeim, Covell & Tummino LLP

(57) ABSTRACT

A system and method for facilitating personalization of one or more multi-instance software applications in a networked enterprise computing environment. An example method includes providing a first user option to specify one or more adjustments to a rendering of a software application; identifying one or more servers that are employed to obtain content for the rendering; and selectively providing information specifying the one or more adjustments to the one or more servers, such that the one or more adjustments appear in a rendering provided when a user accesses the software application from any of the one or more servers. In a more specific embodiment, the information specifying the one or more adjustments to the one or more servers include customization metadata (also called personalization metadata) stored on a first server, called the gateway server.

20 Claims, 7 Drawing Sheets

(56) References Cited

U.S. PATENT DOCUMENTS

2014/0053061 A1\* 2/2014 Chasen .............. G06F 17/2247
715/234
2014/0096014 A1 4/2014 Johnson et al.
2016/0011756 A1 1/2016 Afzal \* cited by examiner

PERSISTENT USER PERSONALIZATION

BACKGROUND

The present application relates to computing, and more specifically to methods, systems, and accompanying user interfaces for facilitating configuring and using software applications in networked computing environments.

Mechanisms for configuring and using networked software applications are employed in various demanding applications including, suites of interoperable Enterprise Resource Planning (ERP) software applications running on different servers of a server cluster or cloud system, cloud computing applications used for scientific research purposes, social media content aggregating websites, and so on. Such applications often demand efficient mechanisms that may be configured and operated seamlessly from various different computing interfaces and systems.

Seamless configurability and operability of networked computing applications are particularly important in enterprise computing environments, where multi-instance integrated software applications are common, and where inefficiencies in configuring the software applications and user interfaces may be costly.

Conventionally, certain enterprise networked computing applications may be accessible via one or more customizable webpages. Enterprise application implementations often involve webpages that may run multiple instances of applications that are associated with different web services, where each web service may call content or other webpages from different content servers. The content is collected and displayed to the user via a single webpage interface. The resulting so-called aggregated webpage may have various windows or portions of content from different websites hosted by different web servers.

Conventionally, configuration of a networked software application, such as a website that employs plural scripts, may involve calling one or more web services and/or Application Programming Interfaces of different servers.

Configurability or customizability of the resulting aggregated webpage can be important for user productivity. However, conventionally, mechanisms for efficiently implementing such customizability are relatively inefficient and may require that the user access the aggregated page through the same server or system through which the page was configured.

SUMMARY

An example method for facilitating personalization or customization of one or more multi-instance software applications in a networked enterprise computing environment includes providing a first user option to specify one or more adjustments to a rendering of a software application; identifying one or more servers that are employed to obtain content for the rendering; and selectively providing information specifying the one or more adjustments to the one or more servers, such that the one or more adjustments appear in a rendering provided when a user accesses the software application from any of the one or more servers.

In a more specific embodiment, the rendering is presented via a user interface display screen, which is user accessible via client device in communication with one or more servers used to host the software application. The information specifying the one or more adjustments to the one or more servers include customization metadata (also called personalization metadata) stored on a first server, called the gateway server.

The specific example embodiment further includes receiving user input to customize a User Interface (UI) display screen that displays content derived from plural servers; and synchronizing customization metadata between the plural servers, such that customized metadata from each of the plural servers is collected or combined, and redundant or duplicate metadata is discarded or ignored. Each of the plural servers is adapted to provide a portion of content that is user accessible via an aggregated UI display screen.

The example method may further include accumulating webpage metadata from the plural servers, resulting in accumulated metadata; combining the accumulated metadata with synchronized user customization metadata; and employing the combined metadata to render the aggregated UI display screen.

The plural servers may include one or more servers that are part of a same or similar server cluster. The example method may further include providing the first user option to specify the one or more adjustments, e.g., personalizations (also called customizations herein), via a UI display screen that is rendered in response to communication of the client device with a first server of the server cluster, i.e., when the client device requests a customized aggregated UI display screen pertaining to a personalized webpage from one or more servers of the server cluster.

The example method may further include providing second user option to access a UI screen presenting aggregated content from plural servers of the server cluster. Server-side software may then automatically access the customization metadata.

Accessed customization metadata is collected, and redundant customization metadata is omitted from the collected customization metadata, resulting in merged customization metadata in response thereto. Content to be rendered via an aggregated UI display screen is also collected from one or more servers of the server cluster. The merged customization metadata, the collected content, and any additional webpage metadata is then employed by a rendering engine to render the aggregated UI display screen.

In an illustrative embodiment, the software application includes: an interaction hub running on a first server system; a financials application running on a second server system; a human resources application running on a third server system; and an enterprise learning application running on a fourth server system of the server cluster.

A gateway server is employed to get UI display screen metadata from UI display screen metadata handlers in all content servers serving content for the aggregated UI display screen; merge UI display screen metadata and customization metadata and remove duplicate data; merge UI display screen content (removing duplicate content), resulting in merged UI display screen content; and employ merged UI display screen metadata, customization data, and merged content to generate UI display screen markup.

Hence, certain embodiments discussed herein facilitate synchronization of (or otherwise transfer of customization or personalization information to) servers in a server cluster that participate in rendering or providing content used in an aggregated UI display screen, representing a webpage of a multi-instance application. Accordingly, users can now log into any participating server of the server cluster; make modifications to how the UI display screen appears or functions, and then have these customizations appear when the user accesses the aggregated UI display screen from any other participating server in the server cluster.

Note that conventionally, in multi-instance app environment (e.g., application running via plural servers of server cluster), any changes or modifications that a user may have made via one server will not typically apply when the user employs a different server or application instance to view an associated aggregated UI display screen or webpage. Certain embodiments discussed herein overcome associated problems, enabling a webpage to appear similarly, regardless of the system (e.g., server and/or associated application instance) via which the webpage is viewed.

A further understanding of the nature and the advantages of particular embodiments disclosed herein may be realized by reference of the remaining portions of the specification and the attached drawings.

DETAILED DESCRIPTION OF EMBODIMENTS

Figure 1:
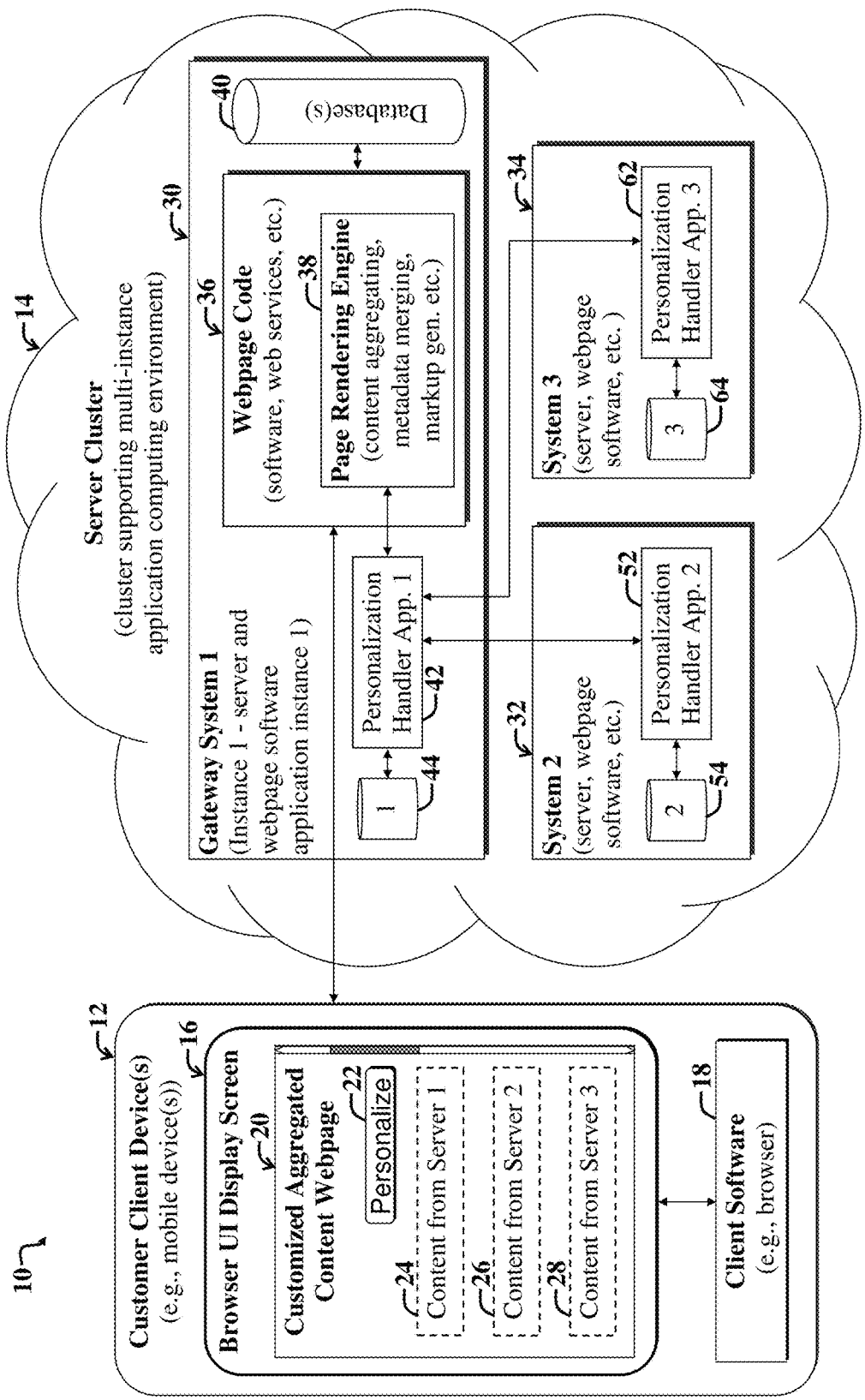
FIG. 1 illustrates a first example embodiment of a system for facilitating persistent user personalization in multi-instance application computing environments.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, routers, Internet Service Providers (ISPs), identity management systems, workflow orchestrators, Tenant Automation Systems (TASs), certain web services, Application Programming Interfaces (APIs), and so on, are not necessarily explicitly called out in the figures. However, those skilled in the art with access to the present teachings will know which components to implement and how to implement them to meet the needs of a given implementation.

FIG. 1 illustrates a first example embodiment of a system 10 for facilitating persistent user personalization in an enterprise computing environment involving multi-instance applications.

An enterprise computing environment that involves execution of multiple instances of software applications (which may interact) on one or more server clusters represents a type of multi-instance computing environment. In particular, for the purposes of the present discussion, a multi-instance computing environment may be any computing environment, whereby one or more servers of a server cluster are used to run one or more different instances of a software application, where associated content and functionality may be used together with other running instances.

A server cluster may be any collection of one or more servers that may communicate with one or more other servers of the collection of servers. In general, a running server cluster often represents a type of multi-instance computing environment.

For the purposes of the present discussion, a multi-instance software application may be any software application that is adapted to employ computing resources (e.g., running application instances) from one or more computers or systems (e.g., servers) that may be separate from the system used to access a UI display screen or rendering of the application. The terms "multi-instance software application" and "multi-instance application" are employed interchangeably herein.

Note that, in general, groupings of various modules of the system 10 are illustrative and may vary, e.g., certain modules may be combined with other modules or implemented inside of other modules, or the modules may otherwise be distributed differently among a network or within one or more computing devices, without departing from the scope of the present teachings. Furthermore, various modules may include additional modules that are not necessarily explicitly called out in the figures.

For the purposes of the present discussion, a server system may be any collection of one or more servers. A server may be any computing resource, such as a computer and/or software that is adapted to provide content, e.g., data and/or functionality, to another computing resource or entity that requests it, i.e., the client. The terms "server" and "server system" may be employed interchangeably herein.

A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

The example system 10 includes one or more client devices 12 in communication with an example server cluster 14 via a network, such as the Internet. The server cluster 14 includes intercommunicating servers or server systems 30-34 which may be specialized to run different types of Enterprise Resource Planning (ERP) software applications, e.g., an Interaction Hub (IH), Financials/Supply Chain Management (FSCM), Human Resources Management System (HRMS), Enterprise Learning Management (ELM), and so on.

The example server cluster 14 includes a first gateway system (system 1) in communication with a second server system 32 and a third server system 34. The various server systems 30-34 include software, including webpage software, whereby a client device may authenticate, i.e., sign into one or more websites hosted thereby. The websites provide rendering instructions for UI display screens to be displayed on client devices, where the UI display screens include content, including UI controls and associated functionality, which are associated with running instances of enterprise software.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or page. Pages may include sections, such as sub-views or sub-windows, dialog boxes, graphs, tables, other UI display screens, and so on. In certain cases, a UI display screen may refer to all application windows presently displayed on a display.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

For illustrative purposes, the first gateways system 30 is shown including webpage code 36 in communication with backend enterprise databases 40 via web services, Application Programming Interfaces (APIs), and/or other interface mechanisms. The example webpage code 36 includes a page rendering engine 38, which is adapted to generate a rendering for multi-instance applications, e.g., by aggregating content from the various server systems 30-34; merging metadata characterizing or describing the content, and generating markup comprising the rendering in accordance with a UI architecture.

For the purposes of the present discussion, a rendering may be any computer instructions or information suitable for determining visual one or more features and associated functionality that are adapted to be displayed via a UI display screen. Accordingly, a file that includes information that is displayable via a browser or other application UI may include a "rendering." Similarly, the actual visual information displayed in a UI display screen may also be called a rendering. Depending upon the context, the term "rendering" may be taken to include just the visual aspects of a UI display screen and/or underlying instructions used to generate the UI display screen or features thereof, or may further include functionality associated with the displayed features.

In general, as the term is used herein, a rendering of a software application may include a UI architecture (or representations or characterizations thereof) associated with the software application. A UI architecture may be any framework or set of rules or guidelines employed to render a UI display screen or portion thereof. A UI architecture may, for example, specify a method and/or organization (e.g., organization of UI controls and associated functionality) for enabling or facilitating user interaction with a software application. The terms "UI architecture" and "UI framework" may be employed interchangeably. However, a UI framework, as the term is used herein further includes any descriptions and accompanying computer code for rendering a UI display screen in accordance with a set of criteria specifying how components of a UI display screen are to be characterized, e.g., sized, positioned, shaped, validated, and so on.

Note that, for the purposes of the present discussion, a UI display screen may be different than a rendering, to the extent that a UI display screen is used to illustrate a rendering, but a rendering may exist regardless of whether it is displayed via a UI display screen.

The page rendering engine 38 communicates with a first personalization handler application 42, which may selectively store personalization metadata and other metadata, e.g., additional webpage content metadata, in a first metadata store or repository 44. Note that in certain implementations, the metadata store 44 may be implemented via one or more of the backend databases 40.

For the purposes of the present discussion, personalization metadata may be any user-specified information characterizing an appearance and/or functionality of a software application and/or associated UI display screen, e.g., aggregated UI display screen. In general, metadata may be any information characterizing or otherwise about other information or functionality different from the metadata itself.

The terms "personalization metadata" and "customization metadata" are employed interchangeably herein.

Content may be any information and/or functionality, e.g., data presented via a UI display screen, user interface controls, and so on, and/or functionality underlying the user interface controls. Accordingly, UI content may be any information characterizing a UI display screen, such as an appearance and/or functionality. UI content may include HyperText Markup Language (HTML) characterizations of webpage content to be displayed in a web client window (e.g., a browser window) and may further include other information, such as metadata, characterizing UI elements that are adapted to be read by client-side software and rendered in accordance with and consistent with the client-side platform. The term "platform" may refer to the operating system and accompanying device features, including resident hardware and software functionality.

Like the first gateway system 30, the second system 32 and third system 34 include respective personalization handler applications 52, 62, which communicate with respective metadata stores 54, 64. In general, all of the systems 30-34 may also act as content servers that maintain content and functionality for running instances of networked applications that may be employed to create an aggregated UI display screen 16 displayable on the client devices 12.

In the present example embodiment, the personalization handler applications 42, 52, 62 are adapted to intercommunicate and may include functionality for handling not just personalization metadata, but other metadata characterizing webpage content as rendered via a page rendering engine, e.g., the page rendering engine 38.

For the purposes of the present discussion, an aggregated UI display screen, such as the display screen 16 presented via a browser, may be any UI display screen that illustrates content or otherwise provides access to functionality associated with plural software applications that may run independently, e.g., on different servers of a server cluster. An aggregated UI display screen may illustrate content from multiple instances of different networked software applications within a single overall application border or window.

The various personalization handler applications 42, 52, 62 include computer code for enabling merging of personalization metadata and other metadata. Content or data is said to be merged if the content is combined, added, or otherwise collected, and then any duplicate data is removed or otherwise ignored. The terms "merging of metadata" and "synchronization of metadata" may be employed interchangeably herein.

The example browser UI display screen 16 illustrates a webpage representing customized aggregated content webpage 20. The customized aggregated content webpage 20 includes personalization user option 22, e.g., as may be implemented via a user interface control, such as a button, drop-down menu, or other mechanism, as discussed more fully below.

For illustrative purposes, the customized aggregated content webpage 20 is shown further including various sections 24-28, including a first section 24 representing content provided by an application instance running on the first gateway system 30; a second section 26 representing content provided by another application instance running on the second system 32; and a third section 28 representing content provided by yet another instance of an application running on the third system 34.

The client devices 18 include client-side software, e.g., a browser 18, which is adapted to communicate with one or more of the systems 30-34 of the server cluster 14 to retrieve the customized aggregated content webpage 20 for display in the browser UI display screen 16.

In an example scenario, the different server systems 30-34 run instances of different networked enterprise applications, such as an interaction hub running on the first server system 30, a financials application running on the second server system 32, a human resources application running on the third system 34, and an enterprise learning application running on another server system or running concurrently with another application on one or more of the other systems 30-34.

A user may log into any of the applications, e.g., as may be implemented via webpage code 36. The application or system through which the user logs in is called the gateway system or application herein. Note that when a user accesses a page adapted to enable user specification of personalizations or customizations, such personalization page may be rendered by the same or different system as the system used to access or view content on subsequent occasions. In either case, the system used to initiate personalization or to enable access to content of the customized aggregated content webpage 20 is called the gateway system, as discussed more fully below.

From the resulting displayed interface, one or more user options are provided to enable access to an aggregated content webpage, also called a landing page or dashboard. The resulting landing page or dashboard provides one or more user options to personalize or customize the content appearing therein.

Information specifying the customizations is pushed or otherwise shared and synchronized or merged with other systems of the server cluster 14. Accordingly, after a personalization made through one of the systems 30-34, such personalization will subsequently appear when the client device(s) 12 are then subsequently employed to access and/or further personalize a customized aggregated content webpage, e.g., the webpage 20.

Hence, in summary, gateway system may store user personalization data for a particular page, e.g., via one or more of the metadata stores 44, 54, 64. When a user specifies changes to a page, the representative metadata is stored in live systems. If an offline system is brought back online, then the latest user personalization data is replicated to that system. This makes it possible to hot swap content provider systems without interrupting the ability of users to personalize aggregated content pages.

Figure 2:
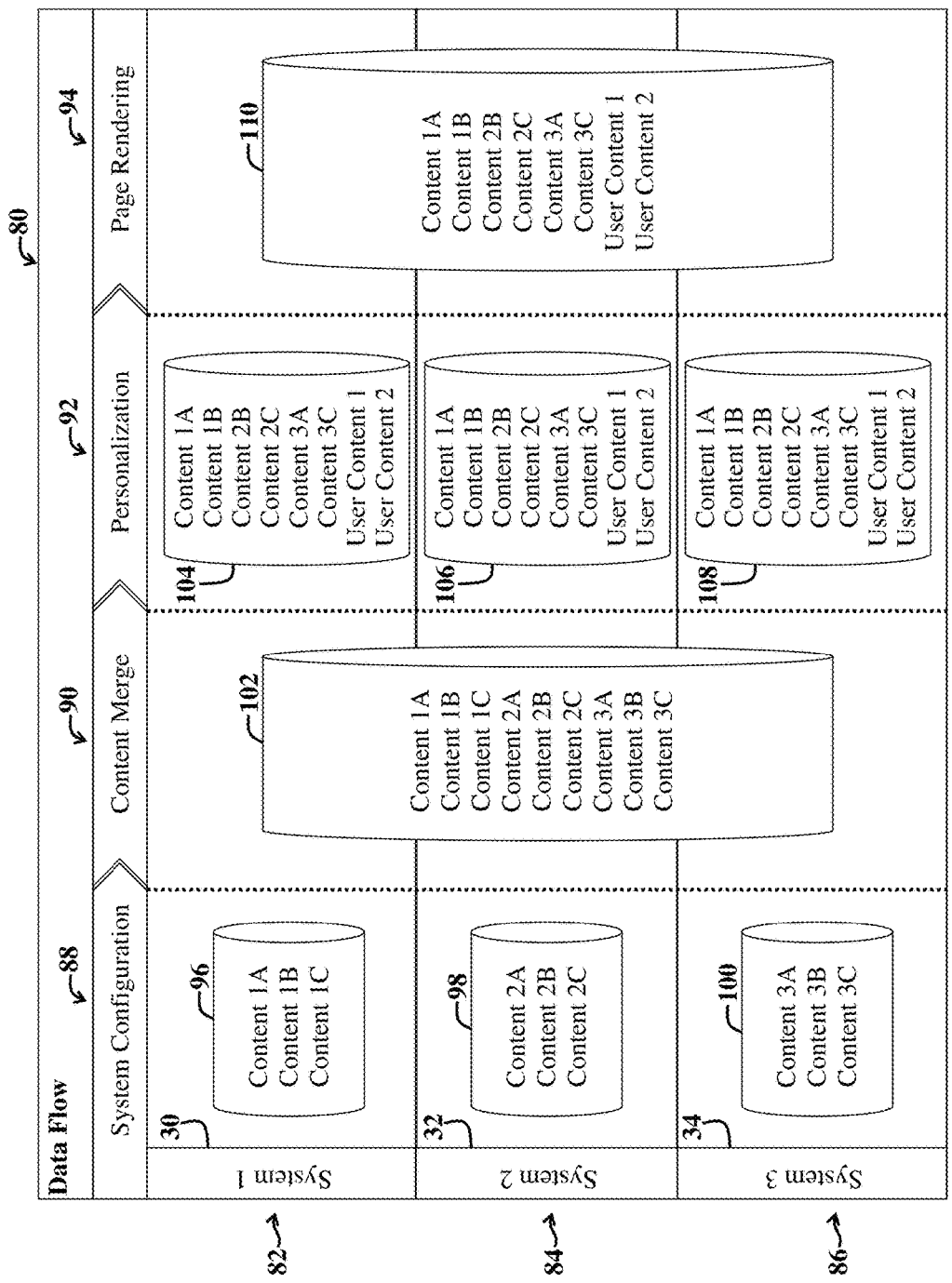
FIG. 2 an example data flow diagram illustrating aggregation and synchronization of data and personalization metadata between servers of a cluster involved in a multi-instance computing environment.

FIG. 2 is an example data flow diagram illustrating a process 80 involving aggregation and synchronization of data and personalization metadata between servers of a cluster involved in a multi-instance computing environment. The process 80 facilitates implementation of persistent user personalization, i.e., personalization that propagates to all participating systems of a server cluster. A participating system may be any server system that runs an application instance whose content is displayable or accessible via an aggregated content UI display screen or page.

The example process illustrates merging of content and metadata from three systems 30-34 and is characterized by three respective paths 82-86 occurring during system configuration 88, content merging 90, personalization 92, and page rendering 94.

For illustrative purposes, during system configuration, the first system 30 is characterized by a first set of webpage content (content 1A-1C) 96; the second system 32 is characterized by a second set of webpage content (content 2A-2C) 98; and the third system 34 is characterized by a third set of webpage content (content 3A-3C) 100.

Subsequently, during content merging 90, content from the three systems 30-34 is combined, resulting in aggregated content 102 that is distributed to all of the participating systems 30-34.

Next, during a personalization phase 92, a user chooses to selectively omit some of the content 102 from an associated aggregated page and to add additional user content or metadata (user content 1 and user content 2). These changes then appear as separate sets of content 104-108, which are synchronized and replicated among the systems 30-34, e.g., via the personalization handlers 42, 52, 62 shown in FIG. 1.

Note that the personalization handlers 42, 52, 62 shown in FIG. 1 may include various additional or potential separate modules, without departing from the scope of the present teachings. For example, separate modules may be employed to merge or synchronize webpage content, webpage content metadata, and additional personalization data.

Subsequently, during page rendering 94, a personalized aggregated content webpage is then rendered based on aggregated synchronized content 110, including personalization metadata (user content 1 and user content 2).

Figure 3:
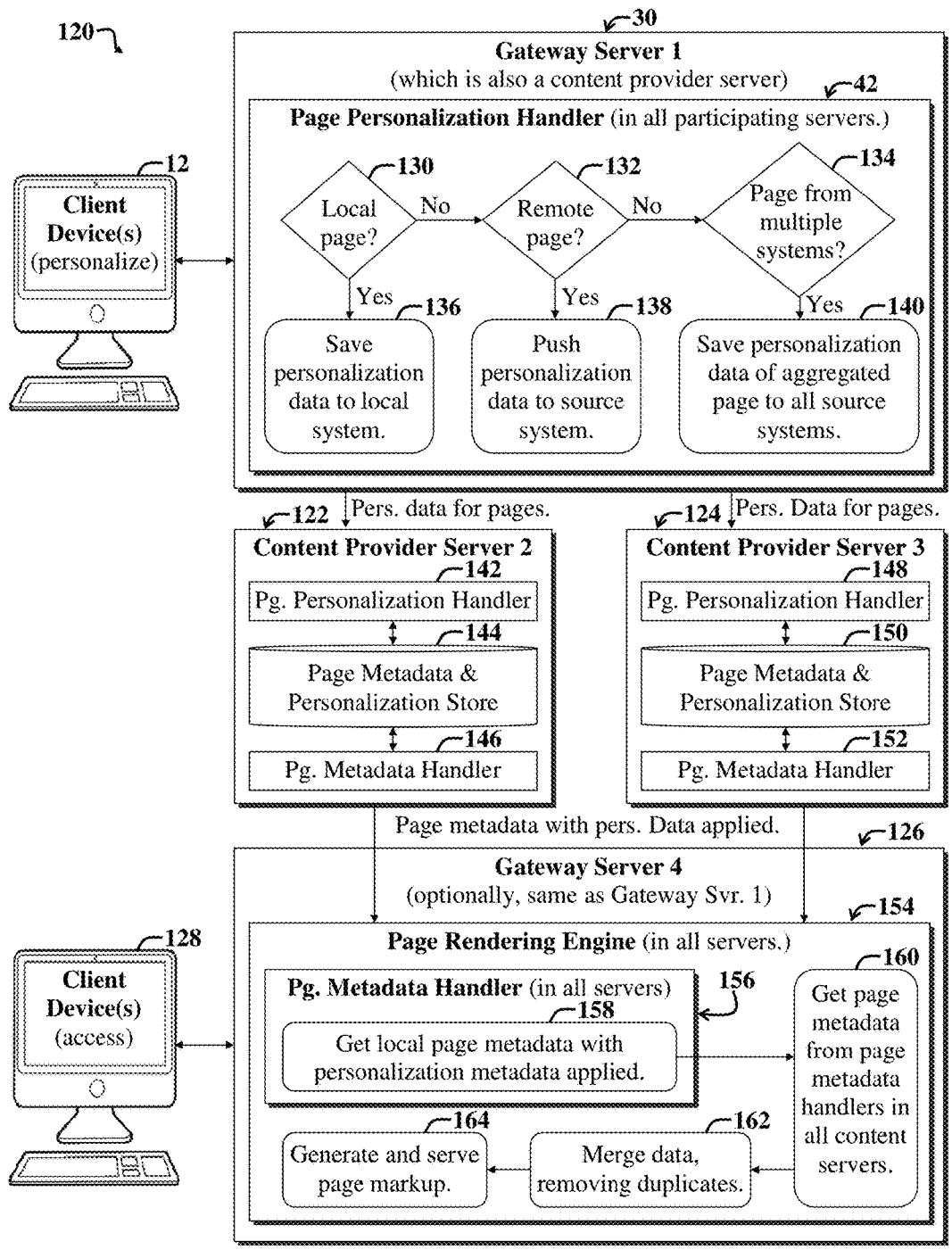
FIG. 3 is an example hybrid block diagram and process flow diagram illustrating example processes that is usable by the system of FIG. 1 to implement persistent user personalization.

FIG. 3 is an example hybrid block diagram and process flow diagram illustrating example processes of a system 120 that are usable by the system 10 of FIG. 1 to implement persistent user personalization.

The system 120 includes a first gateway server 30 in communication with client device(s) 12 used for personalization of an aggregated content webpage, e.g., a landing page or dashboard. A second set of one or more client devices 128 are employed to access and display the resulting aggregated content webpage. Note however, that in practice, the first set of one or more client devices 12 and the second set of one or more client devices 128 may be implemented via the same one or more client devices.

The first gateway server 30 selectively pushes metadata, such as personalization metadata, to content provider servers, i.e., systems 122, 124, which provide content to be rendered via an aggregated content webpage, also called a multi-instance application interface. The content provider servers 122, 124 also push metadata to another gateway server 126, which may or may not represent the same server as the first gateway server 30. The other gateway server 126, called the fourth server or system, generates a rendering for the aggregated webpage, which is accessible to the second set of one or more client devices 128.

Specifically, the first gateway server 30 implements various steps 130-140 as part of the page personalization handler 42, a version of which runs on all of the participating systems 30, 122, 124, 126. The steps 130-140 include an initial checking step 130, which involves checking of the page to be personalized is a local page or not. If the page is a local page, then personalization metadata is saved to the associated local system in a first saving step 136.

Otherwise, a second checking step 132 is performed. The second checking step 132 includes checking whether or not the page to be personalized is a remote page sourced from one single system. If the page is a remote page sourced from one single system, then personalization metadata is pushed to the source system in a first metadata-pushing step 138.

Otherwise, a third checking step 134 is performed. The third checking step 134 includes checking whether or not the page to be personalized includes content for an aggregated page sourced from multiple systems. If so, then personalization data associated with an aggregated page is pushed or otherwise saved to all participating source systems in a second metadata-pushing step 140.

Example participating source systems 122, 124 receive pushed personalization metadata from the first gateway system 30. A content provider server, called the second server 122, includes a second page personalization handler 242 in communication with a page metadata and personalization metadata store or repository 144, which is accessible to a page metadata handler 146. Note that the page metadata handler 146 and the page personalization handler 142 may be incorporated into the same module, without departing from the scope of the present teachings.

Similarly, another example content provider server, called the third server 124, includes a third personalization handler 148 in communication with another page metadata and personalization store 150, which is accessible via another page metadata handler 152.

When the gateway server 126 prepares to serve a page, various steps 156-164 of a page rendering engine 154 are performed. In the present example embodiment, versions of the page rendering engine 154 are included in all server systems 30, 122, 124, 126 of the overall system 120, whether or not the rendering engines are explicitly shown.

The example page rendering engine 154 of the fourth server 126, i.e., access gateway server, employs fourth page metadata handler 156 to get, i.e., receive pushed metadata or otherwise request and receive metadata for a local aggregated page, as shown in a metadata-getting step 158. The collected metadata includes page metadata with personalization metadata applied.

Subsequently, a system-level metadata-retrieval step 160 includes getting page metadata from page metadata handlers (e.g., handlers 142, 146, 148, and/or 152, and any handlers in the first gateway system 30) from all content servers. Note that the first gateway server 30 may also act as a content server, without departing from the scope of the present teachings.

Next, a data merging step 162 is performed, whereby metadata is collected, and duplicate data is removed from the collection, placed aside, or otherwise ignored. The resulting merged page data and metadata, including personalization metadata is then employed by a rendering step 164, which includes generating and serving page markup sufficient to display a rendering of a personalized aggregated webpage.

Hence, the overall system 120 is adapted to facilitate persistent user personalization in a multi-instance application environment, e.g., server cluster. Aggregated content from multiple application instances, one of which may be defined as the gateway, is then used to render a personalized aggregated webpage.

In general, a gateway system (and all participating server systems, which may also act as gateways when logged into by a user) has special logic, i.e., computer code, that is adapted to store and apply user personalization metadata characterizing the aggregation of contents on a particular aggregated content webpage.

This enables consistent application of personalizations of UI display screens independently of a particular instance used to view the page. By enabling dynamic allocation of any instance as the gateway instance or system, while maintaining the personalization and uniform view of the page, can yield substantial benefits. For example, a content provider system may optionally hot swapped in and out of a cluster of participating servers, without disrupting user ability to personalize an aggregated page.

Figure 4:
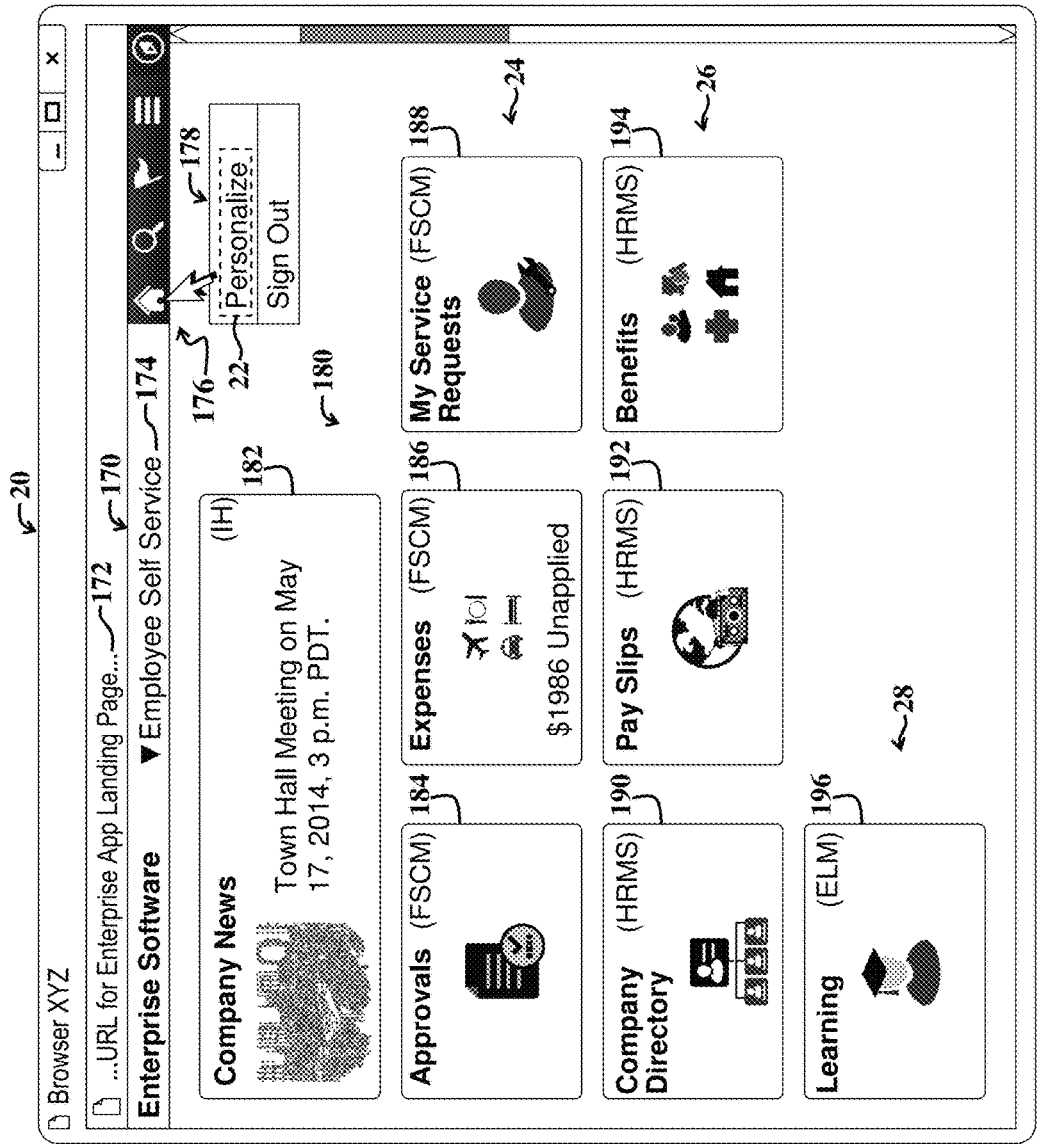
FIG. 4 shows a first example UI display screen, which may be displayed on the client device of FIG. 1 and used to view aggregated content from multiple servers of the server cluster.

FIG. 4 shows a first example UI display screen 20, which may be displayed on the client device(s) 12 of FIG. 1 and used to view aggregated content from multiple servers of the server cluster.

The example UI display screen 20 displays a representation of an aggregated content webpage 170, which may be user accessible via a particular predetermined Uniform Resource Locator URL) 172. The webpage 170 represents an employee self-service aggregated content interface, as indicated via drop-down menu 174 selection.

Note that in certain embodiments, a user may have access to plural differently customized aggregated content webpages, e.g., via the drop-down menu 174, which may enable user selection of different aggregated content webpages. For example, other aggregated content webpages may include a manager self-service page, a procurement operations page, a project management page, a cash management page, and so on. User options may be provided for enabling a user to add and/or manage aggregated pages, also called landing pages, dashboard pages, or home pages, as indicated above.

A set of UI controls 176 may provide various user options 178, including a personalization option, which may be activated via selection of a personalization button or link 22.

Content of the aggregated webpage 170 (also simply called page herein) includes various tiles 180, where each tile may represent a software component of an application running on a participating server. For illustrative purposes, tiles derived from different systems are arranged in different rows; however, implementations do not require this.

For example, a first row includes a company-news tile 182 representing an Interaction Hub (IH) application instance. Another set of example tiles 24 includes an approvals tile 184, an expenses tile 186, and a my-service-requests tile 188. These tiles 184-188 may represent content from different components of a Financials/Supply Chain Management (FSCM) application instance running on a separate server system from the server system running the company-news tile 182.

Similarly, a third set of tiles 26 may represent content from different components of a Human Resources Management System (HRMS) application instance running on a separate server system (of the associated server cluster of participating server systems) from the servers running the IH and FSCM instances. The third set of tiles 26 includes an example company directory tile 190, a pay-slips tile 192, and a benefits tile 194. A third example row 28 includes a learning tile 196, as sourced from an Enterprise Learning Management (ELM), which may run on yet another server system of the server cluster.

Note that upon user selection of the personalization option 22, additional UI controls and mechanisms may be displayed to enable users to add or remove different tiles from the various tiles 80 and to perform other personalizations or customizations, as discussed more fully below with reference to FIG. 5.

If a user logs into one of the underlying systems, e.g., the IH, FSCM, HRMS, and/or ELM system, such systems may provide access to a similar page 170 as shown. In other words, if a user personalizes a page from one system and then logs into another system in the same cluster of participating server systems, then the user may see the exact same number of tiles in the same order and with the same personalizations as the page has been configured on another server system of the cluster.

If you personalize the page from one system, and then login to another system in the same cluster, you will see the exact same number of tiles in the same order on the page as configured. When one of the systems in the cluster is taken offline, a user may still be able to log in to another system and see the same page with the exact same number of tiles in the same order on the page as configured.

Figure 5:
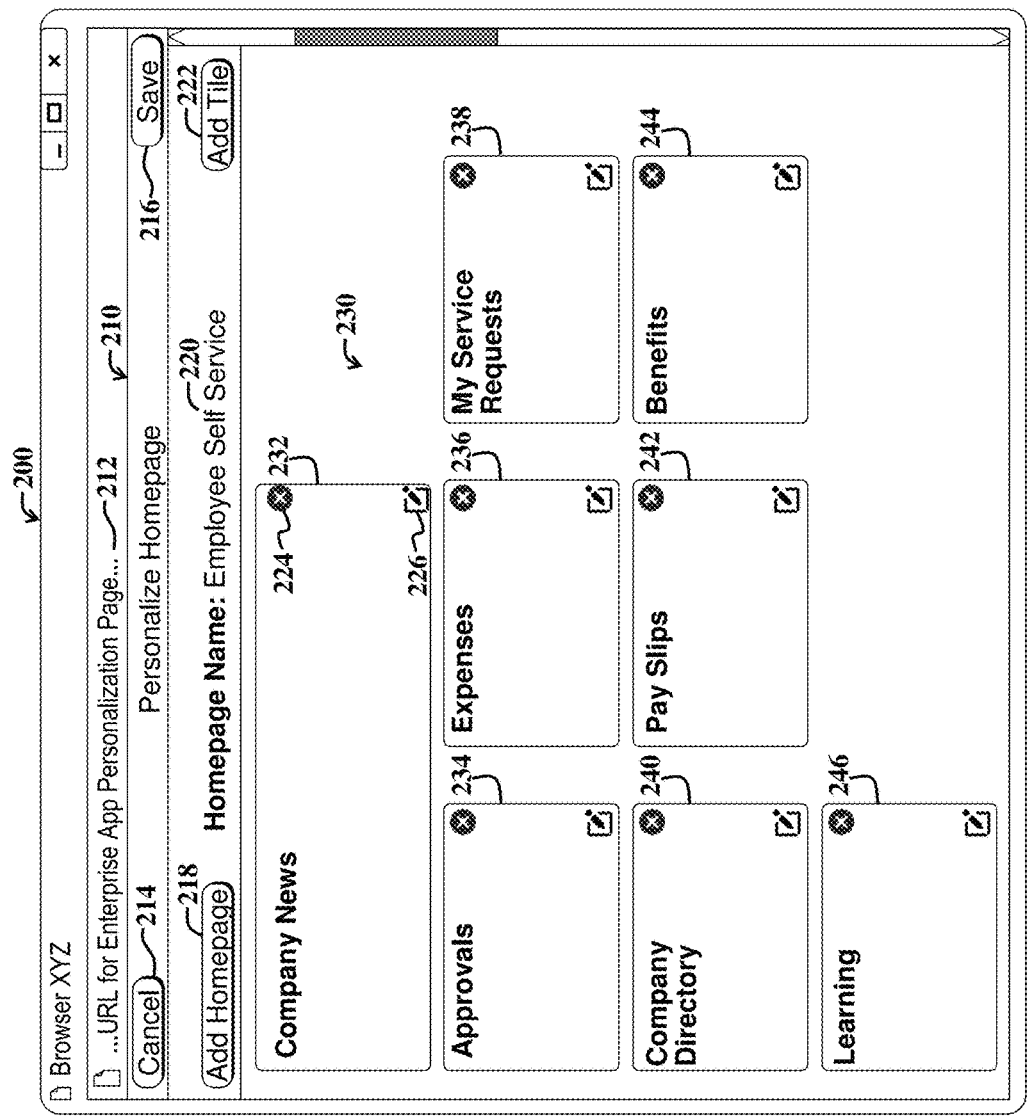
FIG. 5 shows a second example UI display screen enabling user customization of the UI display screen of FIG. 4.

FIG. 5 shows a second example UI display screen 200 enabling user personalization or customization of the UI display screen 20 of FIG. 4. The example UI display screen 20 illustrates an aggregated content page 210 accessible via a URL 212 that may appear in response to user selection of the personalization option 22 of FIG. 4.

The customization page 210 includes various UI controls, e.g., a cancel button 214, a save button 216, an add-homepage button 218, an add-tile button 222, and a drop-down menu 220 for switching between different landing pages for further personalization or customization thereof.

Various tiles 230, including a company-news tile 232, an approvals tile 234, an expenses tile 236, a my-service requests tile 238, a company directory tile 240, a pay-slips tile 242, a benefits tile 244, and a learning tile 246 correspond to respective tiles 182-196 of the UI display screen 170 of FIG. 4. The various tiles 232-246 each include a delete button 224 for enabling quick removal of a tile from the configuration webpage 210 and corresponding webpage 170 of FIG. 4.

After a user finishes personalizing the webpage 210 (and/or additional pages accessible via the drop-down menu 220) via the various controls 218-226, the user may then save the customizations by selecting the save button 216. Resulting metadata specifying the personalizations is then collected in a metadata store for use by associated personalization metadata handlers. The personalization metadata handlers then ensure synchronization of the customization metadata between participating server systems of the associated server cluster.

Figure 6:
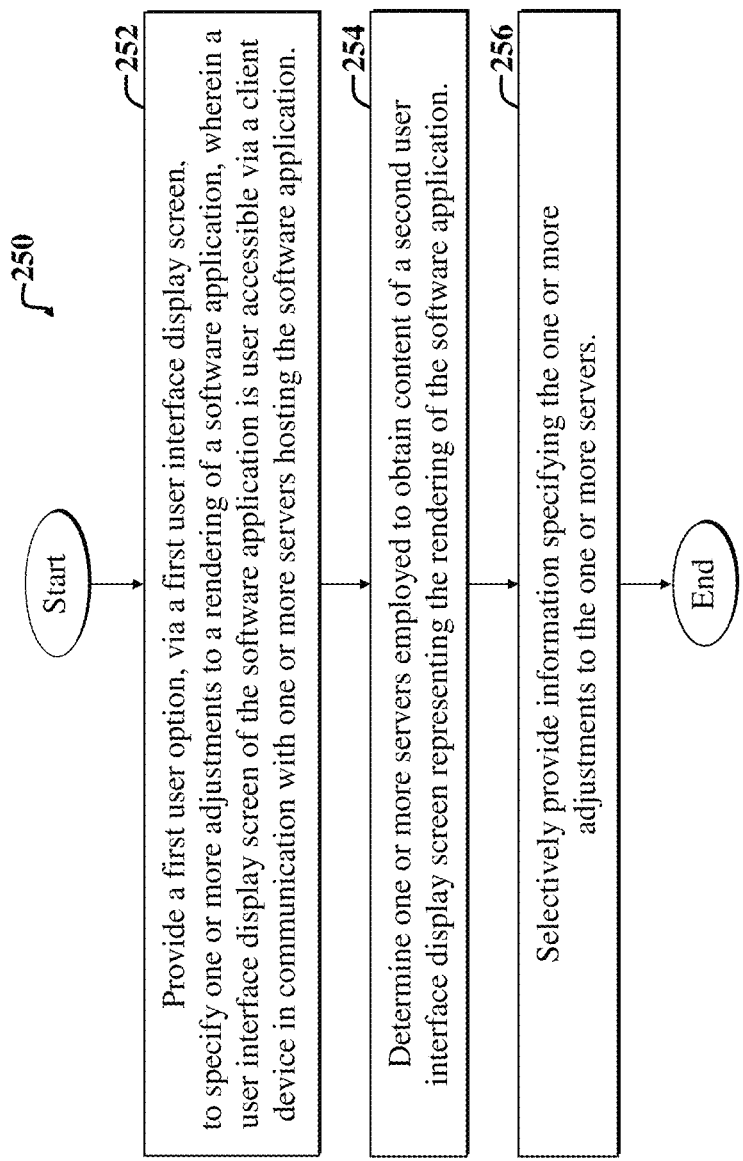
FIG. 6 is a flow diagram of a first example method adapted for use with the embodiments of FIGS. 1-5.

FIG. 6 is a flow diagram of a first example method 250, which is adapted for use with the embodiments of FIGS. 1-5. The example method 250 is adapted to facilitate personalization of one or more multi-instance software applications in a networked enterprise computing environment.

The example method includes an initial personalization step 252, which includes providing a first user option, via a first UI display screen, to specify one or more adjustments to a rendering of a software application. A UI display screen of the software application is user accessible via a client device in communication with one or more servers hosting the software application.

Subsequently, a server-determining step 254 includes determining one or more servers employed to obtain content of a second UI display screen representing the rendering of the software application.

Finally, a metadata-transfer step 256 includes selectively providing information specifying the one or more adjustments to the one or more servers, i.e., participating servers.

Note that the method 250 may be augmented or otherwise changed or altered, without departing from the scope of the present teachings. For example, an alternative method consistent with the method 250 may include receiving user input to customize a UI display screen that displays content derived from plural servers; synchronizing customization metadata between the plural servers, wherein each of the plural servers is adapted to provide a portion of content that is user accessible via an aggregated UI display screen.

Another alternative method consistent with the method 250 includes accumulating webpage metadata from the plural servers, resulting in accumulated metadata; combining the accumulated metadata with synchronized customization metadata; and employing the combined data to render the aggregated UI display screen. The plural servers may include one or more servers that are part of a same or similar server cluster.

Such alternative example method may further include providing a user option to access a UI screen presenting aggregated content from plural servers of the server cluster; automatically accessing customization metadata representing the information specifying one or more adjustments for each application of the server cluster for which content and functionality thereof is to be rendered in an aggregated UI display screen; discarding redundant customization metadata, resulting in merged customization metadata in response thereto; collecting content to be rendered via aggregated UI display screen from one or more servers of the server cluster, resulting in collected content in response thereto; and employing the merged customization metadata and the collected content to facilitate rendering the aggregated UI display screen.

An access gateway server may be employed to collect page metadata with customization data applied for the access gateway server; get page metadata from page metadata handlers in all content servers serving content for the aggregated page; merge page metadata and customization metadata and remove duplicate data; merge page content (removing duplicate content), resulting in merged page content; and employ merged page metadata, customization data, and merged content to generate page markup.

Figure 7:
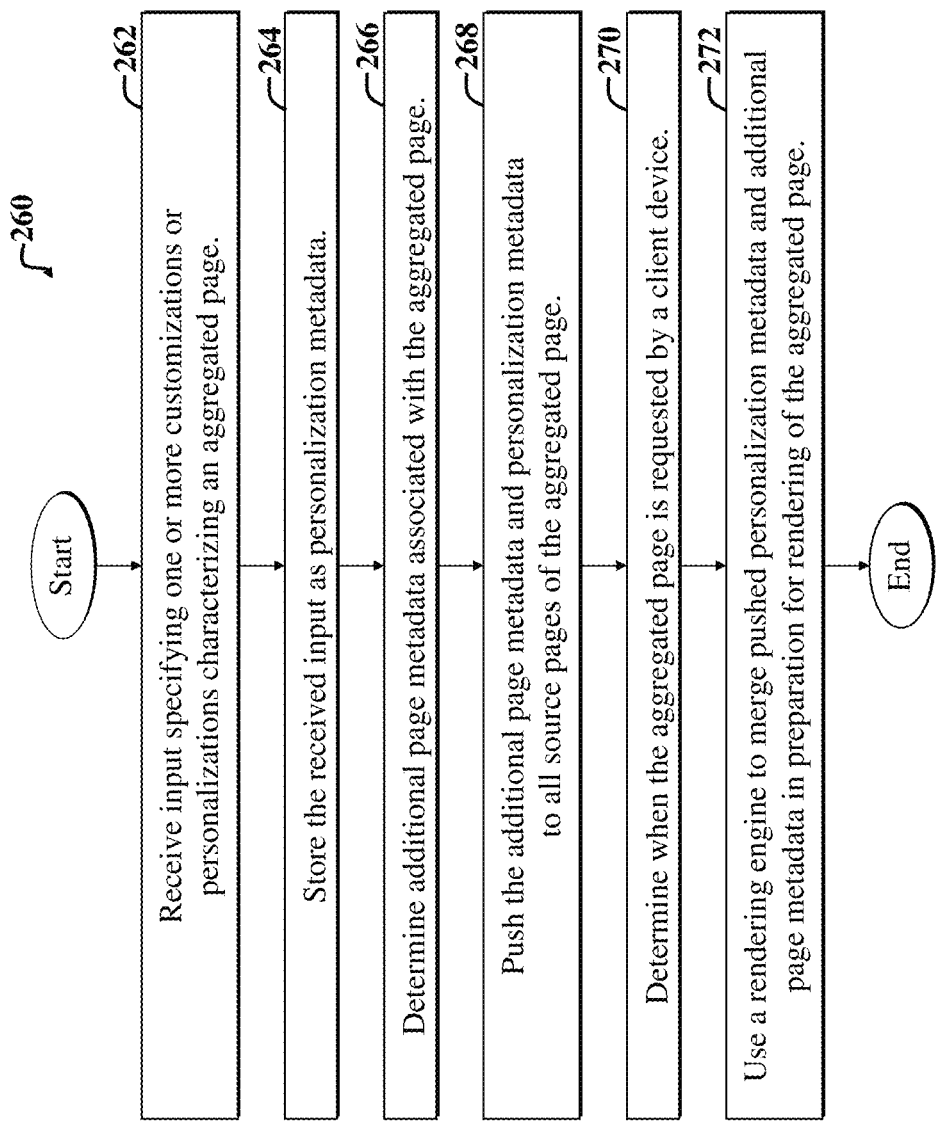
FIG. 7 is a flow diagram of a second example method adapted for use with the embodiments of FIGS. 1-6.

FIG. 7 is a flow diagram of a second example method 260 adapted for use with the embodiments of FIGS. 1-6. The example method 260 includes a first step 262, which involves receiving input specifying one or more customizations or personalizations characterizing an aggregated page.

A second step 264 includes storing the input as personalization metadata.

A third step 266 includes determining additional page metadata associated with the aggregated page.

A fourth step 268 includes pushing the additional page metadata and personalization metadata to all source pages of the aggregated page.

A fifth step 270 includes determining when the aggregated page is requested by a client device.

A sixth step 272 includes using a rendering engine to merge pushed personalization metadata and additional page metadata in preparation for rendering of the aggregated page.

Note that the method 260 may be modified without departing from the scope of the present teachings. For example, the method 260 may be modified to be specifically applicable to multi-instance enterprise applications running on an enterprise server cluster.

Although the description has been described with respect to particular embodiments thereof, these particular embodiments are merely illustrative, and not restrictive. For example, while certain embodiments are discussed herein with respect to enterprise applications running on different servers of a server cluster but selectively intercommunicating via web services or APIs, embodiments are not limited thereto. In general, any networked computing environment, e.g., as may be accessed via a webpage interface, may be adapted to employ methods discussed herein for synchronization metadata personalization or customization information between computers or servers involved in generating content for the webpage.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating customizing of one or more software applications in an enterprise computing environment, the enterprise computing environment including one or more client devices in communication with one or more gateway servers in a server cluster, the server cluster also comprising two or more content servers, the two or more content servers being networked to the one or more gateway servers, wherein the one or more gateway servers execute webpage software, wherein the webpage software provides webpage information accessible to the one or more client devices, wherein one or more servers of the server cluster perform the method comprising:

in response to a user login input, establishing a first login session of a first instance of a multi-instance software application hosted on one or more of any servers in the server cluster;

providing a first user option to specify one or more adjustments to a rendering of the first instance of the software application associated with the first login session, wherein at least one of the one or more adjustments relates to content supplied by a particular content server of the two or more content servers that is unique to the particular content server and is not shared during the first login session between any of the two or more content servers;

identifying two or more specific content servers of the server cluster that are employed to obtain content for the rendering during the first login session;

based on determining that any of the one or more adjustments do not relate only to content provided by a gateway server to which a client device is connected in the first login session, selectively pushing customization metadata, specifying the one or more adjustments, to two or more content servers of the two or more specific content servers, thereby storing redundant copies of the customization metadata specifying the one or more adjustments on the two or more content servers of the two or more specific content servers;

initiating a second instance of the multi-instance software application that is operationally different from the first instance of the software application after the one or more adjustments have been made during the first login session in response to the first user option; and retrieving and merging pushed customization metadata from at least one of the two or more content servers of the two or more specific content servers, on which redundant copies of the customization metadata are stored, to enable the second instance of the software application to implement, to the rendering during a second login session of the multi-instance software application established in response to another user login input, the one or more adjustments made during the first login session.

2. The method of claim 1, wherein a User Interface (UI) display screen of the software application is adapted to display the rendering and is user accessible via one of the one or more client devices.

3. The method of claim 1, wherein the customization metadata is stored on one of the one or more gateway servers.

4. The method of claim 3, further including:
receiving user input to customize a User Interface (UI) display screen that displays content derived from plural servers in the server cluster; and synchronizing the customization metadata between the plural servers, wherein each of the plural servers is adapted to provide a portion of content that is user accessible via an aggregated UI display screen.

5. The method of claim 4, further including:
accumulating webpage metadata from the plural servers, resulting in accumulated metadata;
combining the accumulated metadata with synchronized user customization metadata; and
employing the combined metadata to render the aggregated UI display screen.

6. The method of claim 1, further including providing the first user option to specify one or more adjustments via a User Interface (UI) display screen rendered in response to communication of the client device with the gateway server to which the client device is connected.

7. The method of claim 1, further including providing second user option to access a UI screen presenting aggregated content from plural servers of the server cluster.

8. The method of claim 7, further including automatically accessing the customization metadata for each application of the server cluster for which content and functionality thereof is to be rendered in an aggregated User Interface (UI) display screen.

9. The method of claim 8, wherein the retrieving and merging pushed customization metadata comprises collecting accessed customization metadata, and omitting redundant customization metadata from collected customization metadata, resulting in merged customization metadata in response thereto.

10. The method of claim 9, further including collecting content to be rendered via the aggregated UI display screen from one or more servers of the server cluster, resulting in collected content in response thereto.

11. The method of claim 10, further including employing the merged customization metadata and the collected content to facilitate rendering the aggregated UI display screen.

12. The method of claim 7, wherein the software application includes:
an interaction hub running on a first server of the server cluster;
a financials application running on a second server of the server cluster;
a human resources application running on a third server of the server cluster; and
an enterprise learning application running on a fourth server of the server cluster.

13. The method of claim 1, wherein the customization metadata describes personalizations made to an aggregated User Interface (UI) display screen and is pushed to all servers that act as content sources for content presented via the UI display screen.

14. The method of claim 13, further including:
employing a content server to adjust UI display screen content and customization information; and
employing an access gateway server to:
collect UI display screen metadata with customization data applied for the access gateway server;
get UI display screen metadata from UI display screen metadata handlers in all content servers serving content for the aggregated UI display screen;
merge UI display screen metadata and customization metadata and remove duplicate data;
merge UI display screen content (removing duplicate content), resulting in merged UI display screen content; and employ merged UI display screen metadata, customization data, and merged content to generate UI display screen markup.

15. An apparatus for facilitating customization of one or more software applications in an enterprise computing environment, the enterprise computing environment including one or more client devices in communication with one or more gateway servers in a server cluster, the server cluster also comprising two or more content servers, the two or more content servers being networked to the one or more gateway servers, wherein the one or more gateway servers execute webpage software, wherein the webpage software provides webpage information accessible to one or more client devices, the apparatus comprising one or more servers of the server cluster configured to perform the following acts:

in response to a user login input, establishing a first login session of a first instance of a multi-instance software application hosted on one or more of any servers in the server cluster;

providing a first user option to specify one or more adjustments to a rendering of the first instance of the software application associated with the first login session, wherein at least one of the one or more adjustments relates to content supplied by a particular content server of the two or more content servers that is unique to the particular content server and is not shared during the first login session between any of the two or more content servers;

identifying two or more specific content servers of the server cluster that are employed to obtain content for the rendering during the first login session;

based on determining that any of the one or more adjustments do not relate only to content provided by a gateway server to which a client device is connected in the first login session, selectively pushing customization metadata, specifying the one or more adjustments, to two or more content servers of the two or more specific content servers, thereby storing redundant copies of the customization metadata specifying the one or more adjustments on the two or more content servers of the two or more specific content servers;

initiating a second instance of the multi-instance software application that is operationally different from the first instance of the software application after the one or more adjustments have been made during the first login session in response to the first user option; and retrieving and merging pushed customization metadata from at least one of the two or more content servers of the two or more specific content servers, on which redundant copies of the customization metadata are stored, to enable the second instance of the software application to implement, to the rendering during a second login session of the multi-instance software application established in response to another user login input, the one or more adjustments made during the first login session.

16. A non-transient tangible storage medium including instructions executable by one or more servers of a server cluster for facilitating customization of one or more software applications in an enterprise computing environment, the enterprise computing environment including one or more client devices in communication with one or more gateway servers in the server cluster, the server cluster also comprising two or more content servers, the two or more content servers being networked to the one or more gateway servers, wherein the one or more gateway servers execute webpage software, wherein the webpage software provides webpage information accessible to one or more client devices, the tangible storage medium including instructions for:

in response to a user login input, establishing a first login session of a first instance of a multi-instance software application hosted on one or more of any servers in a network of servers in the server cluster;

providing a first user option to specify one or more adjustments to a rendering of the first instance of the software application associated with the first login session, wherein at least one of the one or more adjustments relates to content supplied by a particular content server of the two or more content servers that is unique to the particular content server and is not shared during the first login session between any of the two or more content servers;

identifying two or more specific content servers of the server cluster that are employed to obtain content for the rendering during the first login session;

based on determining that any of the one or more adjustments do not relate only to content provided by a gateway server to which a client device is connected in the first login session, selectively pushing customization metadata, specifying the one or more adjustments, to two or more content servers of the two or more specific content servers, thereby storing redundant copies of the customization metadata specifying the one or more adjustments on the two or more content servers of the two or more specific content servers;

initiating a second instance of the of the multi-instance software application that is operationally different from the first instance of the software application after the one or more adjustments have been made during the first login session in response to the first user option; and retrieving and merging pushed customization metadata from at least one of the two or more content servers of the two or more specific content servers, on which redundant copies of the customization metadata are stored, to implement, to the rendering during a second login session of the multi-instance software application established in response to another user login input, the one or more adjustments made during the first login session.

17. The apparatus of claim 15, wherein the customization metadata describes personalizations made to an aggregated User Interface (UI) display screen and is pushed to all servers that act as content sources for content presented via the UI display screen.

18. The apparatus of claim 17, further including:
employing a content server to adjust UI display screen content and customization information; and
employing an access gateway server to:
collect UI display screen metadata with customization data applied for the access gateway server;
get UI display screen metadata from UI display screen metadata handlers in all content servers serving content for the aggregated UI display screen;
merge UI display screen metadata and customization metadata and remove duplicate data;
merge UI display screen content (removing duplicate content), resulting in merged UI display screen content; and employ merged UI display screen metadata, customization data, and merged content to generate UI display screen markup.

19. The storage medium of claim 16, wherein the customization metadata describes personalizations made to an aggregated User Interface (UI) display screen and is pushed to all servers that act as content sources for content presented via the UI display screen.

20. The storage medium of claim 19, further including instructions for:
employing a content server to adjust UI display screen content and customization information; and
employing an access gateway server to:
collect UI display screen metadata with customization data applied for the access gateway server;
get UI display screen metadata from UI display screen metadata handlers in all content servers serving content for the aggregated UI display screen;
merge UI display screen metadata and customization metadata and remove duplicate data;
merge UI display screen content (removing duplicate content), resulting in merged UI display screen content; and
employ merged UI display screen metadata, customization data, and merged content to generate UI display screen markup.

* * * * *

UNITED STATES PATENT AND TRADEMARK OFFICE
CERTIFICATE OF CORRECTION

PATENT NO. : 10,452,757 B2
APPLICATION NO. : 14/553928
DATED : October 22, 2019
INVENTOR(S) : Pang It is certified that error appears in the above-identified patent and that said Letters Patent is hereby corrected as shown below:

On the Title Page

Column 2, Item (74) under Attorney, Agent, or Firm, Line 1, delete "Sundeim" and insert -- Sundheim --, therefor.

In the Drawings

On sheet 1 of 7, in FIG. 1, under Reference Numeral 34, Line 3, delete "etc. )" and insert -- etc.) --, therefor.

In the Claims

In Column 18, Line 34, in Claim 16, delete "of the of the" and insert -- of the --, therefor.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*